US012718411B2

(12) United States Patent
Knoll et al.

(10) Patent No.: US 12,718,411 B2
(45) Date of Patent: Aug. 25, 2026

(54) MULTI-USE COLOR MEASUREMENT INSTRUMENT WITH LIVE VIEW OF TARGET SURFACE

(71) Applicant: X-RITE, INCORPORATED, Grand Rapids, MI (US)

(72) Inventors: Matthew Knoll, Grand Rapids, MI (US); Michael Weber, Rockford, MI (US)

(73) Assignee: X-RITE INCORPORATED, Grand Rapids, MI (US)

( * ) Notice: Subject to any disclaimer, the term of this patent is extended or adjusted under 35 U.S.C. 154(b) by 504 days.

(21) Appl. No.: 18/259,922

(22) PCT Filed: Dec. 30, 2021

(86) PCT No.: PCT/US2021/065755
§ 371 (c)(1),
(2) Date: Jun. 29, 2023

(87) PCT Pub. No.: WO2022/147303
PCT Pub. Date: Jul. 7, 2022

(65) Prior Publication Data

US 2024/0046522 A1 Feb. 8, 2024

(30) Foreign Application Priority Data

Dec. 30, 2020 (EP) .................................... 20217946

(51) Int. Cl.
*G06T 7/90* (2017.01)
*G06T 7/00* (2017.01)
(Continued)

(52) U.S. Cl.
CPC .............. *G06T 7/90* (2017.01); *G06T 7/0004* (2013.01); *G06T 7/11* (2017.01); *G06T 7/13* (2017.01);
(Continued)

(58) Field of Classification Search
CPC . G06T 7/90; G06T 7/0004; G06T 7/11; G06T 7/13; G06T 11/001; G06T 2200/28;
(Continued)

(56) References Cited

U.S. PATENT DOCUMENTS

2014/0185927 A1* 7/2014 Kawabata ............ G01J 3/0248 382/162
2015/0044098 A1 2/2015 Smart
(Continued)

FOREIGN PATENT DOCUMENTS

EP 2720015 4/2014
EP 3184976 6/2016

*Primary Examiner* — Phuoc Tran
(74) *Attorney, Agent, or Firm* — Hahn Loeser & Parks, LLP

(57) ABSTRACT

A color measurement instrument for measuring colors of areas of interest of a target object, according to one aspect of the present invention, includes a spectral engine, a color camera, a display, and a processor. The spectral engine has a first field of view. The camera has a second field of view, the second field of view being larger than the first field of view and encompassing the first field of view. The processor is coupled to the spectral engine, camera and display. The processor to causes the spectral engine to make a color measurement of an area of interest on the target object within the first field of view and obtains from the camera a measurement image comprising at least a portion of the second field of view including the first field of view. The processor further causes the display of color values from a measurement made by the spectral engine along with at least a portion of the measurement image including the first field of view.

17 Claims, 7 Drawing Sheets

(51) Int. Cl.
*G06T 7/11* (2017.01)
*G06T 7/13* (2017.01)
*G06T 11/10* (2026.01)

(52) U.S. Cl.
CPC .......... *G06T 11/10* (2026.01); *G06T 2200/28* (2013.01); *G06T 2207/10024* (2013.01); *G06T 2207/30108* (2013.01)

(58) Field of Classification Search
CPC . G06T 2207/10024; G06T 2207/30108; G01J 3/0248; G01J 3/0289; G01J 3/28; G01J 3/50; G01J 3/0264
See application file for complete search history.

(56) References Cited

U.S. PATENT DOCUMENTS

2017/0187511 A1 6/2017 Bai
2017/0195586 A1* 7/2017 Borremans .......... G01J 3/2823
2018/0357793 A1* 12/2018 Boes .......................... G06T 7/11
2021/0372920 A1* 12/2021 Ehbets .................. G01J 3/0202

* cited by examiner

MULTI-USE COLOR MEASUREMENT INSTRUMENT WITH LIVE VIEW OF TARGET SURFACE

The present application is a National Stage entry of International Patent Application PCT/US2021/065755, filed Dec. 30, 2021, which claims priority from European Patent Application EP20217946, filed Dec. 30, 2020.

BACKGROUND

Color measurement devices and techniques are used in graphic arts, product manufacturing and other industries and businesses for a variety of purposes, including calibration and color quality assurance purposes. For characterization purposes in the printing industry, for example, a printer may be calibrated by printing standard color patches or a standard test chart comprising color patches of various colors and densities and then measuring each color patch. The color measurements are compared to a reference standard using spectral, densitometric, or colorimetric information for each of the color patches. Printer calibration can then be performed using the measurement results or a printer profile (ICC profile) may then be generated characterizing the printer's performance. Characterization may also be performed in plastics production, ceramics production, textiles production, and other industries.

For quality assurance purposes, in graphic arts, it is common to include control strips of color patches on printed products, often in places which will not be visible or conspicuous in a completed color product. The control strips may comprise the basic printer inks (CMYK inks), extended gamut process inks, spot inks, and combinations thereof. Each of these color patches in a control strip is measured and scored against target spectral values. In other industries, such as production of polymers or architectural products or panels, test panels or products may be manufactured and measured. Additionally, actual production pieces may be measured.

Handheld spectrophotometers are useful for making the color measurements described above. However, they require time consuming precise alignment of the spectrophotometer pick-up optics to perform the measurement. Misalignment may adversely affect color measurements and/or lengthen the measurement process by re-measuring one or more areas of interest, such as test color patches. Also, each repositioning of the handheld spectrophotometer lengthens the time required to record the entire set of measurements.

To reduce the chance of misaligned measurements, targeting aids are often provided. In one example, in the eXact line of handheld spectrophotometers available from X-Rite Inc., a hinged base includes a target window with an aperture. The spectrophotometer body is rotated away from the base to expose the targeting window, which is then centered over the target area of interest. The spectrophotometer body is then rotated down toward the base (similarly to the movement of a stapler) such that the optics can measure the target through the aperture in the targeting window. See, for example, U.S. Pat. No. 6,061,140

While advantageous in many respects, a downside is that the test color patch is obscured from the view of the user during the actual measurement. Also, if not careful, the user may inadvertently move the spectrophotometer with respect to the area of interest to be measured after targeting while lowering the body into the measurement position. Finally, the lift-target-lower operation cannot be used in a continuous scanning mode, so additional targeting aids must be employed.

In another example, a side-mounted tube is provided for illumination and observation optics. Such a design does not require a lift-target-lower operation, but nevertheless the device may be difficult to use properly. For example, smaller targets may be partially or completely obscured by the measurement optics. Also, a user may inadvertently move the measurement device when pressing a button to obtain a measurement.

SUMMARY

A color measurement instrument for measuring colors of areas of interest of a target object, according to one aspect of the present invention, includes a spectral engine, a color camera, a display, and a processor. The spectral engine has a first field of view. The camera has a second field of view, the second field of view being larger than the first field of view and encompassing the first field of view. The processor is coupled to the spectral engine, camera and display, the processor being configured with instructions stored in non-volatile memory that, when executed by the processor, cause the processor to cause the spectral engine to make a color measurement of an area of interest on the target object within the first field of view and to obtain from the camera a measurement image comprising at least a portion of the second field of view including the first field of view. When the color measurement instrument is placed proximate to the target object, the second field of view includes one or more of the areas of interest on the target object. The instructions stored in non-volatile memory further comprise instructions that, when executed by the processor, cause the processor to display color values from a measurement made by the spectral engine along with at least a portion of the measurement image including the first field of view. In some examples, the measurement image is captured by the camera concurrently with the measurement by the spectral engine.

In some examples, the displayed at least a portion of the measurement image comprises a thumbnail image including the first field of view.

The instructions stored in non-volatile memory further comprise instructions that, when executed by the processor, cause the processor to store the color values from a measurement made by the spectral engine along with the measurement image. The measurement image may comprises substantially all of the second field of view. The instructions stored in non-volatile memory further comprise instructions that, when executed by the processor, cause the processor to store the color values from a measurement made by the spectral engine along with the measurement image.

In another example, the instructions stored in non-volatile memory further comprise instructions that, when executed by the processor, cause the processor to generate a live view of the second field of view, to automatically detect one or more areas of interest within the second field of view and to further generate preview color measurements for one or more areas of interest from the live view of the second field of view, and to superimpose the preview measurements over their respective areas of interest in the displayed live view. The instructions stored in non-volatile memory may further comprise instructions that, when executed by the processor, cause the processor to automatically detect areas of interest by detecting a threshold level of color uniformity within a subset of pixels of the image sensor. The preview color measurements may comprise average color values of the subset of pixels. The instructions stored in non-volatile memory further comprise instructions that, when executed by the processor, cause the processor to automatically areas of interest by detecting edges of the plurality of areas of interest.

In another example, the instructions stored in non-volatile memory further comprise instructions that, when executed by the processor, cause the processor to generate a magnified live view of the target object for close visual inspection. The instructions stored in non-volatile memory may further comprise instructions that, when executed by the processor, cause the processor to record images of magnified views of printing or manufacturing defects on the target object for quality assurance purposes. The instructions stored in non-volatile memory may further comprise instructions that, when executed by the processor, cause the processor to record images of magnified views of registration marks for quality assurance purposes.

In another example, the instructions stored in non-volatile memory further comprise instructions that, when executed by the processor, cause the processor to read bar code information on the target object and retrieve quality assurance metrics from a computer/server based on the bar code reading.

In another example, the instructions stored in non-volatile memory further comprise instructions that, when executed by the processor, cause the processor to display a live view of the second field of view on the display with a representation of the location of the first field of view superimposed on the live view of the second field of view. The instructions stored in non-volatile memory further comprise instructions that, when executed by the processor, cause the spectral engine to make a color measurement of an area of interest on the target object within the first field of view.

In some embodiments, the instructions stored in non-volatile memory further comprise instructions that, when executed by the processor, cause the processor to provide visual feedback on the display as to whether the first field of view is wholly occupied by an area of interest, such as by changing color.

In some embodiments, the instructions stored in non-volatile memory further comprise instructions that, when executed by the processor, cause the processor to provide targeting aids superimposed over a live view of areas of interest on the target object.

In some embodiments, the display further comprises a rotatable hinged display. In various embodiments, the spectral engine comprises one of a plurality of selectable spectral filters and a photodiode; a linearly variable filter spectrophotometer; and a diffraction grating type spectrophotometer.

The target object may be any number of color items or products, including but not limited to a printed product, and the areas of interest may comprise printed color test patches.

DETAILED DESCRIPTION

Figure 1:
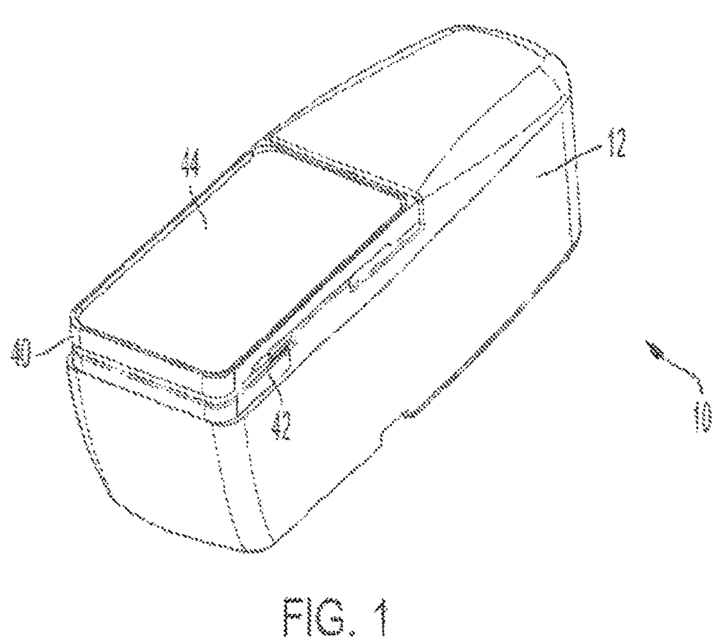
FIG. 1 is a perspective view of a color measurement instrument according to one aspect of the present invention.

In the present disclosure, references in the singular may also include the plural. Specifically, the word "a" or "an" may refer to one, or one or more, unless the context indicates otherwise.

The term "visual appearance" or briefly "appearance" is to be understood broadly as the way in which an object reflects and transmits light, including but not limited to, how individuals viewing the object perceive color and surface texture of the object in various viewing conditions. Appearance also includes instrumented measurements of how an object reflects and transmits light.

One aspect of visual appearance is color. The "color" of an object is determined by the parts of the spectrum of incident white light that are reflected or transmitted without being absorbed. The color of an object can be described by "color attributes". In general terms, color attributes are indicative of the spectral response of the object when it is illuminated by incident light. In the context of the present disclosure, the term "color attribute" is to be understood broadly as encompassing any form of data that is indicative of the spectral response of an object when it is illuminated by incident light. Color attributes can take the form of color values in an arbitrary color space, e.g. in a trichromatic color space like RGB or CIEXYZ, or in any other color space like CIELAB (L*a*b*) or CIE L*C*h, or in the form of spectral data representative of a spectral response of a material to incident light, in arbitrary format. In the context of the present disclosure, color attributes may in particular include absorption and scattering coefficients of a material at a plurality of wavelengths.

The term "colorant" is to be understood as a constituent of a material that provides the appearance of color when light it reflected from it or transmitted through it. Colorants include inks, pigments and dyes. A "pigment" is a colorant that is usually insoluble in a base constituent material. A pigment can be from natural or synthetic sources. A pigment can comprise organic and inorganic constituents. A "dye" is a colorant that is usually soluble in a base constituent material.

The term "formula" is to be understood as relating to a collection of information that determines how an ink or other material is to be prepared. The material may comprise a coating material, such as automotive paint, a solid material, such as plastic materials, a semi-solid material, such as gels, an ink for being applied to a printing substrate, combinations of inks and printing substrates, and combinations thereof. The recipe includes, in particular, the concentrations of the constituents of which the material is composed, such as a base and colorants. A material that has been prepared according to a formula may also be called a "formulation".

The term "database" refers to an organized collection of data that can be accessed electronically by a computer system. In simple embodiments, the database can be a searchable electronic file in an arbitrary format. Examples include a Microsoft Excel™ spreadsheet or a searchable PDF document. In more sophisticated embodiments, a database can be a relational database that is maintained by a relational database management system using a language like SQL.

The term "computer" or "computing device" refers to any device that can be instructed to carry out sequences of arithmetic or logical operations automatically via a program. Without limitation, a computer can take the form of a desktop computer, a notebook computer, a tablet computer, a smartphone, a programmable digital signal processor etc. A computer generally includes at least one processor and at least one memory device. A computer may be a subunit of another device, such as an appearance capture device. A computer may configured to establish a wired or wireless connection to another computer, including a computer for querying a database. A computer can be configured to be coupled to a data input device like a keyboard or a computer mouse or to a data output device like a display or a printer via a wired or wireless connection.

A "computer system" is to be broadly understood as encompassing one or more computers. If the computer system comprises more than one computer, these computers do not necessarily need to be at the same location. The computers within a computer system may communicate with one another via wired or wireless connections.

A "processor" is an electronic circuit which performs operations on an external data source, in particular, a memory device. A processor may comprise a controller or microcontroller.

A "memory device" or briefly "memory" is a device that is used to store information for use by the processor. The memory device may include volatile memory, as for random-access memory (RAM), and nonvolatile memory, as for read-only memory (ROM). In some embodiments, the memory device may include a non-volatile semiconductor memory device such as an (E)EPROM or a flash memory device, which may take the form of, e.g., a memory card or a solid-state disk. In some embodiments, the memory device may include a mass storage device having mechanical components, like a hard disk. The memory device can store a program for execution by the processor. A non-volatile memory device may also be called a non-volatile computer-readable medium.

A "program" is a collection of instructions that can be executed by processor to perform a specific task.

An "area of interest" comprises a portion of a target object to be measured for appearance properties. Areas of interest may comprise printed color test patches or other areas on a printed product, areas of color on a ceramic test panel or product, areas of color on a polymer test panel or product, or areas of color on other substances or items of manufacture.

Figure 2:
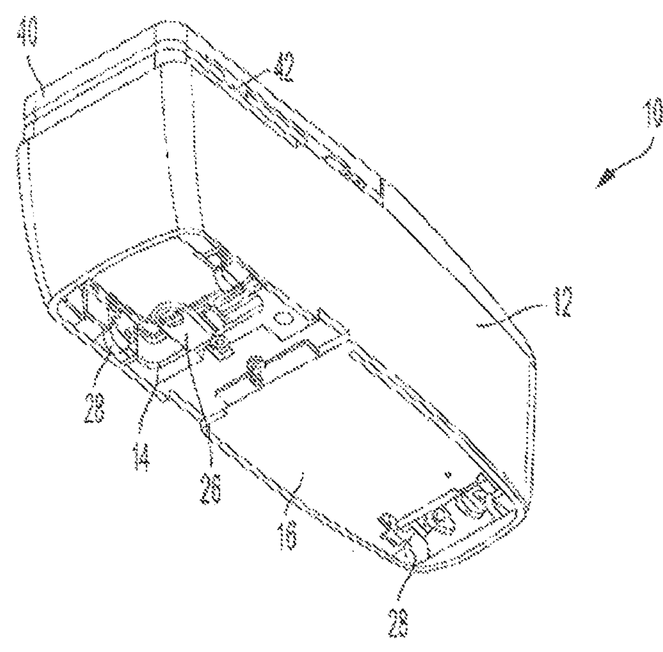
FIG. 2 is a perspective view of an underside of a color measurement instrument according to another aspect of the present invention.
Figure 3:
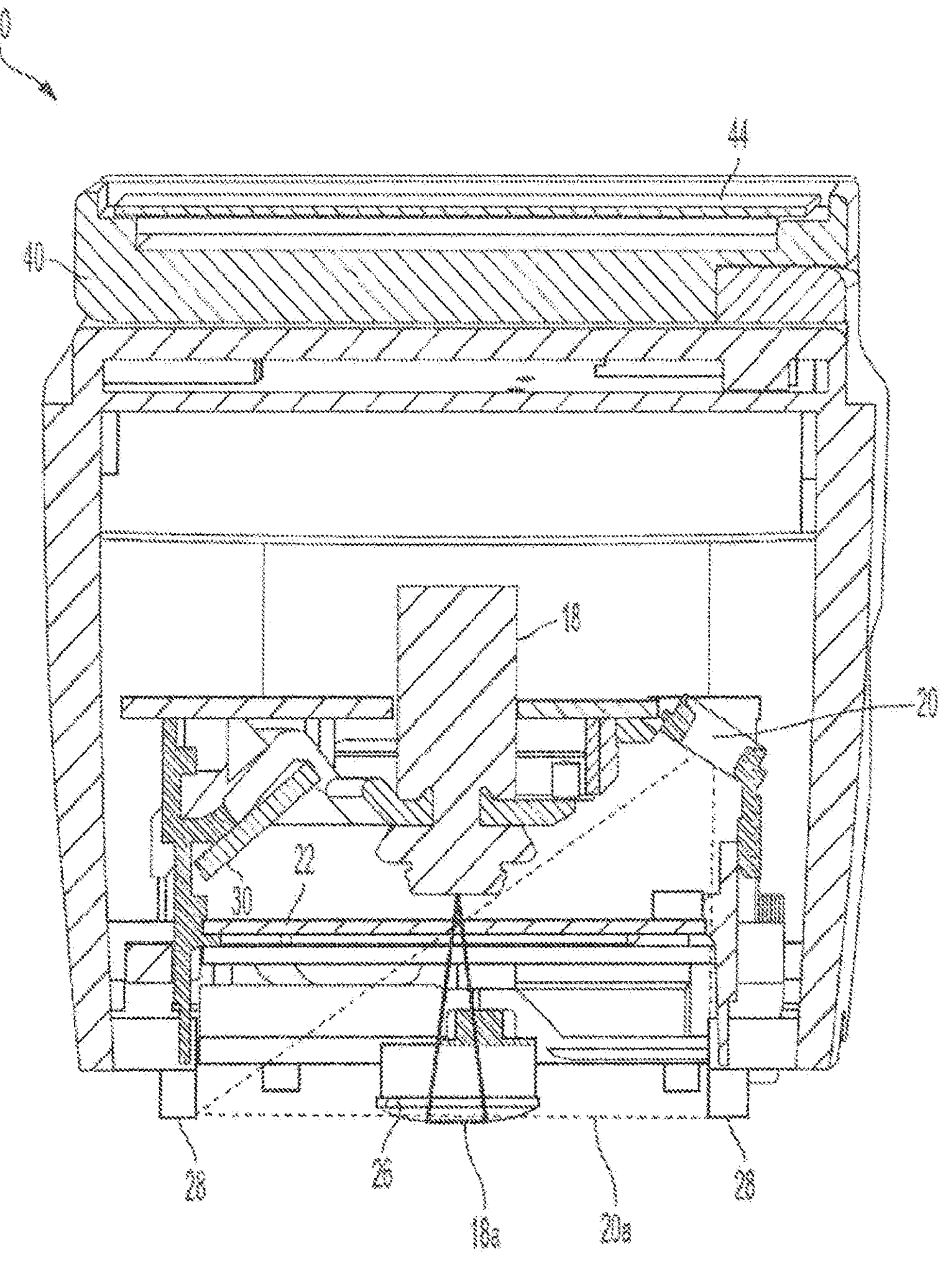
FIG. 3 is a cross section view of a color measurement instrument according to another aspect of the present invention.

Referring to FIGS. 1-3, a color measurement device according to one aspect of the present invention comprises a handheld spectrophotometer 10. The various aspects of the spectrophotometer 10 may also be employed in other color measurement devices, such as benchtop spectrophotometers and hyperspectral imaging color measurement devices.

Spectrophotometer 10 includes a housing 12 having a measurement aperture 14. A frame 16 is disposed within the housing 12. A spectral engine 18 is disposed within the housing on the frame and oriented to have its field of view 18*a* positioned at or about a center of the measurement aperture. In one implementation, the spectral engine field of view 18*a* may be in the range of 1.5 mm to 6 mm. However, the video targeting system of the present invention is not limited to any particular spectral engine and may be used with different embodiments. For example, the invention may be used with a filter-wheel type multi-angle spectrophotometer, a diffraction grating type spectrophotometer, and a linear variable filter type spectrophotometer, and others. Additionally, the spectral engine may comprise a single channel or multi-channel spectrophotometer (e.g., non-polarized and polarized measurement channels). Thus, the invention is not limited to the form of spectrophotometer disclosed herein.

A camera 20 is also disposed within the housing. The camera has a wider field of view than the spectral engine, and is oriented such that its field of view 20*a* covers the measurement aperture 14 and the area surrounding the aperture. The camera field of view in one example is 40 mm by 40 mm, however, varying sizes of the field of view would be appropriate as intended uses and targets vary. The camera 20 comprises optics, such as a lens, and a CMOS or CCD image sensor, or other suitable spatial matrix sensor, capable of live video capture. In the illustrated embodiment, the camera comprises a two-dimensional RGB sensor. In some embodiments, the camera is offset from the spectral engine and angled toward the measurement aperture. This creates some keystone effect, which in some embodiments is corrected digitally.

Optionally, a polarizer 22 may be located on the frame between the measurement aperture 14 and the spectral engine 18 and camera 20. In this example, the polarizer is dimensioned so as not to restrict the field of view 20*a* of the camera 20. In some embodiments, multiple sources of non-polarized light at standard illumination angles are provided. In other embodiments, both polarized and non-polarized illumination sources are provided. Similarly, the spectral engine may include a non-polarized measurement channel, a polarized measurement channel, or both.

A media flattener 26 may be included to flatten a target surface during spectral measurements. Wheels 28 may be included to facilitate scanning measurements.

One or more illuminators 30 are disposed within the housing. The illuminators 30 may be disposed at one or more industry standard measurement angles (e.g., 45°) with respect to a surface to be measured. Each illuminator 30 may comprise one or more LED lamps mounted on a circuit board or module.

A display bezel 40 is mounted on a display hinge 42 to a top of the housing 12. A display 44 is mounted on the display bezel 40. The hinge allows the display bezel 40 and display 44 to lie flat on the top of the housing 12 or rotate up to facilitate reducing glare or viewing the display form the side. The hinge 42 may be single or multi-axis. The display 44 comprises a flat color display, such as a RGB LCD display.

The spectral engine may comprise a conventional narrow band pass filter-based spectral engine. See, for example, U.S. Pat. No. 6,597,454, which is incorporated by reference. In such spectral engines, pick up optics have an observation path to the spectral engine field of view 18*a*. The pickup optics focus observed light onto a filter carrier, such as a filter wheel. The filter carrier has a plurality of narrow band-pass spectral filters, typically having 10 nm wavelength intervals. The light passing through the filter carrier and filters is directed to be incident on a photo diode. During a measurement, the filter carrier is operated such that each spectral filter, and optionally an unfiltered position, is stepped through the optical measurement path and a measurement of light intensity at each filter pass band is measured by the photo diode.

In another embodiment, the photodiode is replaced with a two-dimensional monochrome image sensor. See, for example, U.S. 2018/0357793, which is incorporated by reference. Spectrally separated images of the target surface are acquired at each narrow band pass filter wavelength and assembled into a hyper-spectral image cube. Each color patch would be measured by numerous adjacent pixels, the measured intensities of which may be averaged to determine a measured value for the color patch.

Figure 8:
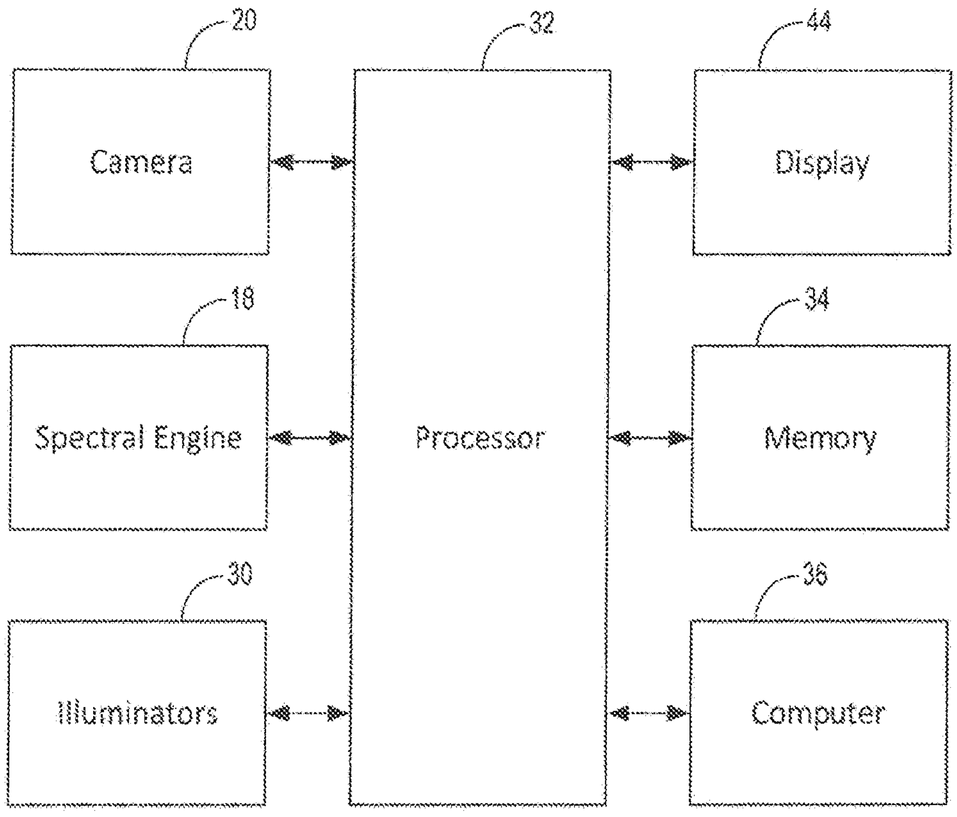
FIG. 8 is a block diagram of a color measurement instrument according to another aspect of the present invention.

Referring to FIG. 8, a processor 32 is coupled to the spectral engine 18, the camera illuminators 30, the display 44 and memory 34. The processor 32 is configured with instructions stored in memory 34 that, when executed, cause the operation of the spectral engine, illuminators, camera and display. In some embodiments, the instructions comprise a program. In some embodiments, the processor 32 is in wired or wireless communication with a computer 36 to which the processor may transfer measurements and quality assurance data. The processor 32 is further configured with instructions to perform image processing as described below.

The following examples of uses of the spectrophotometer 10 are provided in the context of graphic arts color measurement and quality control. However, the spectrophotometer of the present invention, and especially color area recognition and automatic capture, are equally beneficial in other fields of use, including ceramic tiles, plastic articles of manufacture, durable goods, patterned textiles, and other uses.

Figure 4:
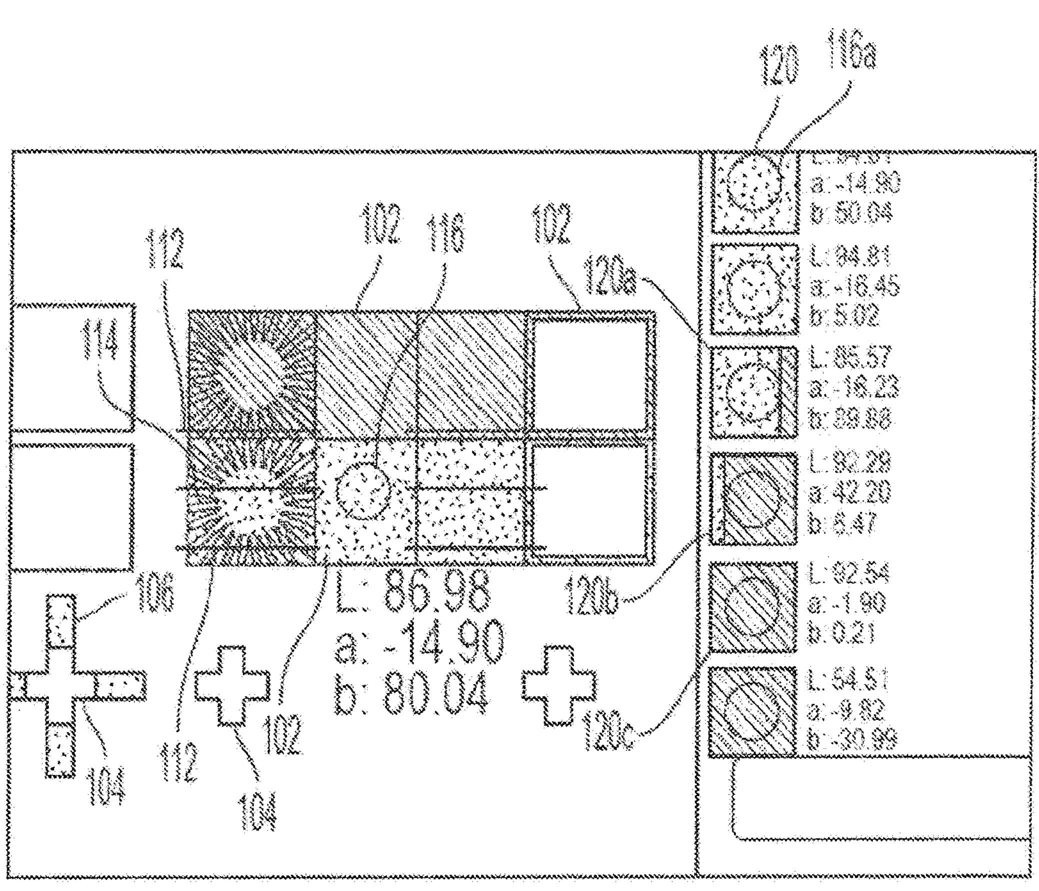
FIG. 4 is a view of a display of the color measurement instrument of FIGS. 1-3, displaying targeting aids and areas of interest to be measured according to another aspect of the present invention.

Referring to FIG. 4, in some embodiments, when making a measurement, the camera field of view is displayed as live video on the display augmented with one or more targeting aids and/or display information about the target surface for a person using the spectrophotometer 10. In some embodiments, during measurements, the camera field of view will encompass one of more color patches 102 and registration marks 104, 106, which are then displayed on the display 44. In some embodiments, the spectrophotometer is mounted for use on a manufacturing or printing line, and the camera field of view is not displayed. However, the camera field of view nevertheless may encompass one of more color patches 102 and registration marks 104, 106, which are automatically recognized and captured as explained in further detail below.

In some embodiments, when in a spectral measurement mode, augmented reality targeting lines 112 and a center line 114 are displayed on the display, along with an indicator of the spectral engine measurement field of view 116. These features are superimposed on a live-view image of an area of the target surface within the camera field of view. The measurement field of view may be an open (unfilled) circle or any other shape suitable to indicate the measurement field of view. In the illustrated example, targeting lines may be spaced to align with outer edges of the color patches. However, various targeting methods may be displayed on the screen. Examples include reticules, cross-hairs, guide lines of various shapes and sizes.

In an example of manual trigger mode, a user moves the spectrophotometer 10 until the superimposed field of view indicator 116 is centered over a color patch (or other area of interest) and presses an electromechanical button or taps a touch screen button provided on the display. In some embodiments, the targeting lines 112 and/or center line 114 are also superimposed over live video image of the color patch to aid in targeting. In response to the user's indication to make a measurement, the spectrophotometer makes a measurement with the spectral engine and captures a measurement image with the camera concurrently with the spectral measurement. "Measurement image" in this context means an image including measurement area of measured by the spectral engine, which does not necessarily comprise in and of itself. "Concurrently with" in this context means during a period of time when the spectral engine is making a measurement or at sufficiently close in time that the measurement image accurately reflects the measurement area measured by the spectral engine.

At least a portion of the measurement image 120 including the measurement field of view indicator 116 and the color patch is captured and displayed, along with the measured spectral data. This image, which may be a small thumbnail image, allows the user to confirm that the measurement is made with proper positioning of the spectrophotometer. In some embodiments, the image and spectral measurements are stored for quality assurance purposes. While a thumbnail image of a small portion of the measurement image may be rendered on the display to allow for concurrent live view display of the target object plus past measurements with thumbnail views as illustrated, the entire measurement image may be stored. Manual trigger mode may be advantageously used when obtaining one or more spot measurements.

In an example of automatic trigger mode, the processor 32 is configured to conduct image analysis of the live video and automatically recognize color patches and other printed or color features. In some embodiments, color patches or other features to be measured are in pre-determined location, and the spectrophotometer 10 recognizes the features. As the spectrophotometer is positioned over a color patch or other feature, or the color patch or feature are moved into view, the processor 32 is configured to detect proper alignment and automatically makes a measurement. This movement of either the spectrophotometer or the area to be measured can be done manually by an operator or automatically by the processor 32. The measurement data and thumbnail image is displayed for confirmation of the measurement. The thumbnail image and/or a complete image acquired by the camera, along with measured spectral values, may be recorded for quality assurance purposes.

In some embodiments, the processor is configured to automatically detect proper alignment of the spectrophotometer over an area of interest, such as a color test patch, by determining a level of color uniformity in pixels of the camera's image sensor that correspond to the field of view of the spectral engine and or surrounding pixels. If color uniformity is above a predetermined threshold, it may be determined that the spectral engine field of view is aligned with an area of interest. An average of the color values of these pixels may be superimposed over the live view of the camera.

In some embodiments, edge detection techniques are applied to images output by the camera sensor to automatically recognize the areas of interest. In some embodiments, a combination of color uniformity detection and edge detection is employed. Edge detection advantageously allows for a subset of pixels within detected edges to be sampled for color uniformity. This speeds processing and provides real-time feedback to a user.

Automatic trigger mode may advantageously be used when obtaining several measurements by passing along a linear strip or non-linear group of color patches to obtain a plurality of spot measurements. In such measurements, the user aligns the spectrophotometer using the live view including targeting lines 112 superimposed over the live view of the surface to be measured. Once the spectrophotometer is aligned with one end of the strip of color patches, the user pushes the spectrophotometer along the length of the strip in one continuous motion. As each color patch comes within the spectral engine field of view, the processor 32 automatically makes a measurement and stores the results. The strip or group of color patches may comprise a linear strip of patches, a two-dimensional matrix of patches and free-form measurements.

The spectrophotometer may also be used in a scanning mode. In this example, the spectral engine continuously makes measurements of a line or two-dimensional array of color patches. Typically, the color patches are pre-defined for scanning measurements.

In some scanning measurement embodiments, the spectrophotometer 10 is used without a person performing targeting, and the display of targeting aids is omitted. In one example, the spectrophotometer 10 may be installed on a production line of, for example, a printing press, and positioned such that the color patches in pre-defined locations pass under the measurement field of view and within the camera field of view after printing. Automatic measurement capture is executed in this example without human targeting or activation. In such embodiments, the spectrophotometer 10 does not necessarily include a video display.

Figure 5:
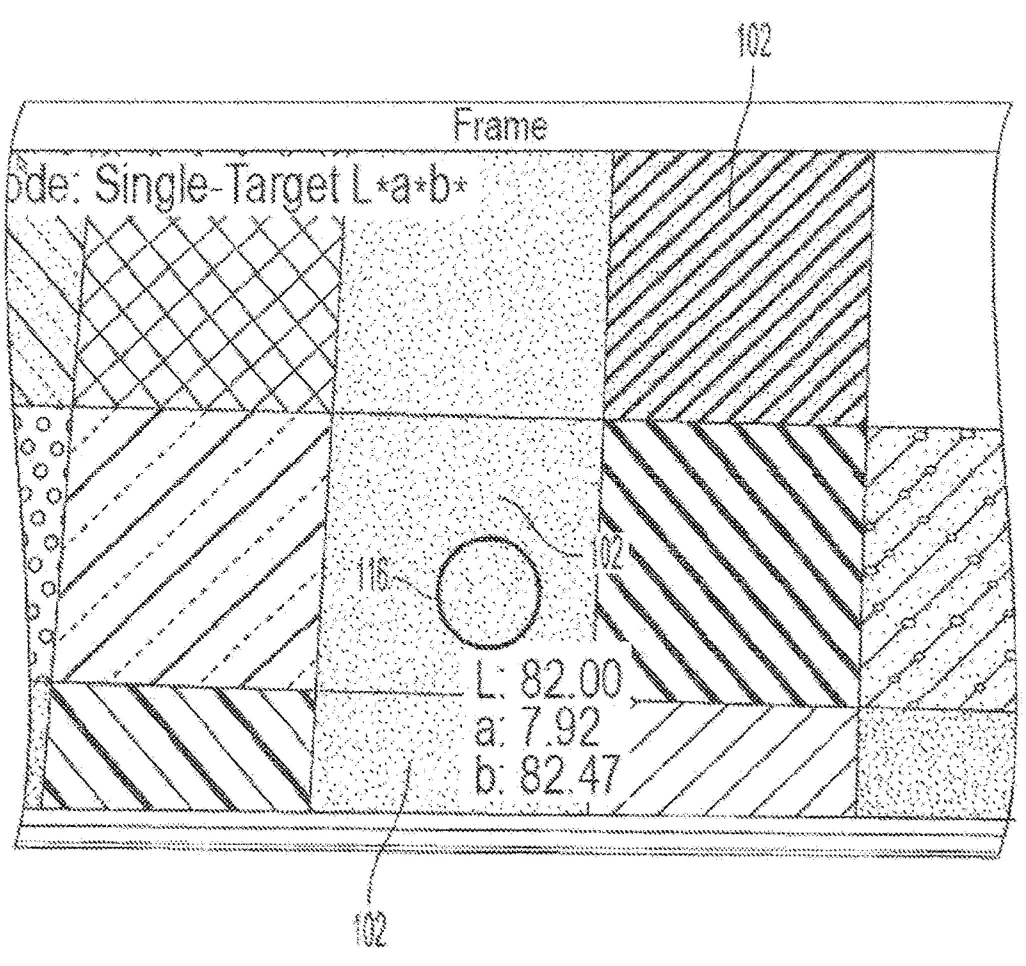
FIG. 5 is a view of the display of the color measurement instrument of FIGS. 1-3, displaying areas of interest with a color measurement of an area of interest according to another aspect of the present invention.

Referring to FIG. 5, in some embodiments, the processor pre-identifies areas of interest. For example, the processor is configured to recognize color patches within the camera field of view and keep track of whether each color patch has been properly measured. For example, if a color patch is recognized by the processor but the user fails to position the spectrophotometer over the color patch, the processor may cause guidance to be displayed to the user to indicate that a color patch has been missed and to position the spectrophotometer for a measurement. This may be done by highlighting the area to be measured in the live view of the target surface. This enables non-linear, unordered acquisitions of measurements. This may be performed for both automatic and manual measurement modes.

Figure 7:
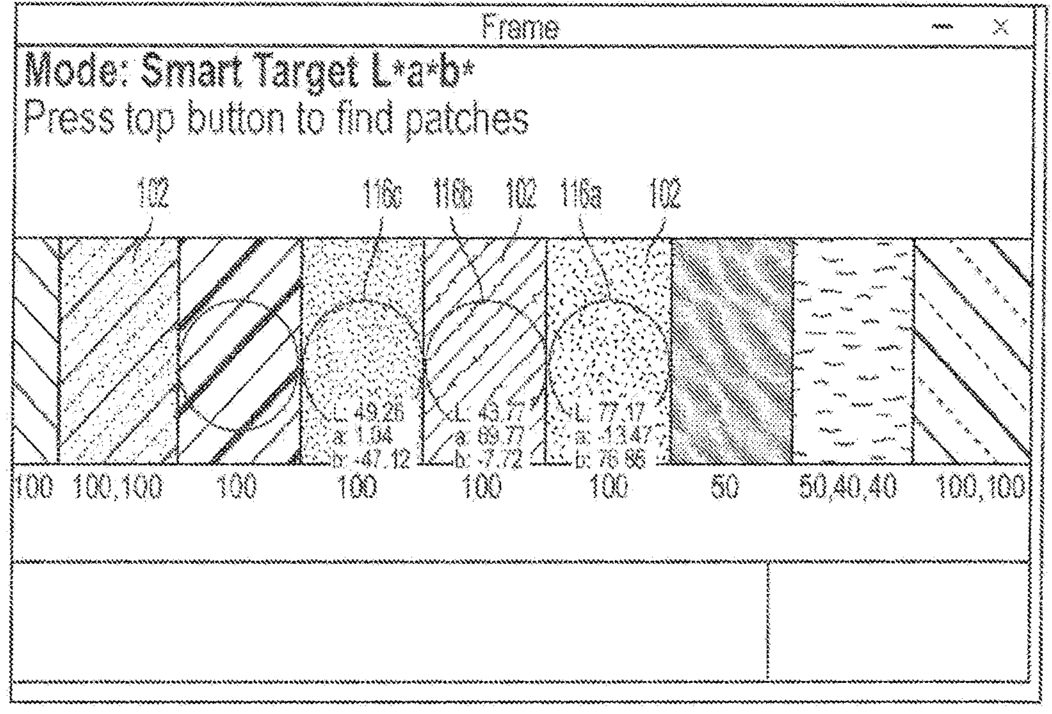
FIG. 7 is a view of the display of the color measurement instrument of FIGS. 1-3, displaying areas of interest and live previews of color measurements according to another aspect of the present invention.

Referring to FIG. 7, in some embodiments, the processor identifies areas of interest in response to a user action, such as a touch of a button. The button may be on a touch-sensitive display or a physical button. The processor may acquire live preview measurements and ensure all of the automatically detected areas of interest are measured as set forth above with respect to FIG. 5.

Referring to FIG. 4, in some embodiments, the processor assesses the quality of a measurement and provides live feedback to a user. For example, if the processor determines that the measurement field of view indicator is correctly positioned when a measurement is made, the processor causes the measurement field of view indicator to be displayed as a green circle. If the processor determines that the spectrophotometer 10 is misaligned, such as by determining that the spectral engine field view 116*a* included parts of two separate patches (see, e.g., images 120*a*, 120*b*, or a border image 120*c*), the processor may display the measurement field of view indicator as a red circle. The processor may also be configured to defer taking a measurement until alignment has been corrected.

In some embodiments, the spectrophotometer 10 has adjustable targeting optics. In such examples, rather than moving the spectrophotometer 10 until the spectral engine field of view is properly positioned, the processor adjusts the optics of the spectral engine to re-position the spectral engine field of view to another area of interest within the camera field of view. This may be done in response to a selection of an area of interest by a user or automatically by the processor upon recognizing a feature to be measured or to correct misalignment.

In another example, referring to FIG. 5, as the processor recognizes color patches, the processor processes the image data to obtain a color value preview. This requires conversion of the RGB values of a portion of the image corresponding to the field of view of the measurement engine into L*a*b* values, for example, or other color space. The color values are superimposed over the color patches as they are measured by the camera. In this way, a user can obtain a quick preview of a series of color patches on a test strip prior to measuring the patches with the spectral engine.

While the foregoing embodiments and use examples are described with respect to printed color patches in a graphic arts application, the invention is not so limited. For example, the invention may be used to measure printed products without test strips by automatically recognizing areas of artwork on the printed product. The invention may also be applied to measure polymer products, architectural paints and coatings, wall coverings, ceramic products, automotive coatings, other coatings and paints, durable goods, or any application where a colored product is produced or manufactured. The invention may also be used with items from which a desired inspirational color is to be measured.

In a ceramic product example, ceramic glaze is fused to a ceramic body. The glaze can impart color and other appearance attributes. A manufacturer of the ceramic product may produce a test panel of a ceramic substrate with one or more glazes having one or more colors or other appearance attributes. The spectrophotometer 10 may image, display and measure (manually or automatically) areas of the test panel much as described above. In these embodiments, the areas of interest are areas of a test panel rather than color ink patches. Alternatively, the spectrophotometer 10 may be used to perform quality assurance measurements on production ceramic goods. The production ceramic goods may have color patterns or other areas of interest which may be detected and measured automatically, along with an image of the measured portion or the color pattern or area of interest. Visual targeting aids may be adjusted in size, spacing, and orientation as needed to suit the ceramic test panel or ceramic product.

In a polymer example, colorants may be mixed with a base material, and thermoformed into a test panel or product. The base material may be, for example, General Purpose Polystyrene (GPPS), nylon, high density polyethylene (HDPE), low density polyethylene (LDPE), and others. A manufacturer of the polymer product may produce a test panel comprising a polymer base material with areas having one or more colorant formulas or other appearance attributes. The spectrophotometer 10 may image, display and measure (manually or automatically) areas of the test panel much as described above. In these embodiments, the areas of interest are areas of a test panel rather than color ink patches. Alternatively, the spectrophotometer 10 may be used to perform quality assurance measurements on production polymer goods. The production polymer goods may have color patterns or other areas of interest which may be detected and measured automatically, along with an image of the measured portion or the color pattern or area of interest. Visual targeting aids may be adjusted in size, spacing, and orientation as needed to suit the polymer test panel or polymer product.

In a textiles example, multi-color textiles may be woven, dyed or printed. The colors may be in patterns or non-patterned. The present invention may be used to target and measure individual colors on the textile product.

In an architectural paint example, a customer may bring a colored object or fabric to a paint retailer as inspiration for a color of a paint. It is known to measure a color of an object to obtain a target color for a paint. However, if the object is multi-colored, it may be difficult to measure the precise area of color to be used as a target color for the paint. The augmented reality aspect of the live video targeting, by displaying the measurement field of view indicator 116 over an image of the object, will help the customer and the retailer identify and target the precise area of interest to measure.

In an architectural product application, flooring materials and other materials may have irregular, multi-colored patterns. The present invention may automatically recognize and measure areas of interest within the architectural product and/or assist in manual measurements of the architectural product by displaying the measurement field of view indicator superimposed over a live view of the architectural product.

While the illustrated embodiment has a separate spectral engine and camera, in another embodiment, the camera is integrated into the spectral engine. In this embodiment, the field of view of the spectral engine and the field of view of the camera are the same. However, automatic target acquisition and automatic trigger mode, and color preview could be accomplished in the same way, then measurements for individual targets calculated from pixels corresponding to a detected target.

For an accurate preview, the camera needs to be calibrated. RGB cameras can be color calibrated using various methods known from color management. For example, standard color charts may be captured by the camera and an ICC camera profile may be generated correcting for the differences between known color values of the color chart and color values detected by the camera. However, the color accuracy which can be achieved is by such methods limited and is impaired by metamerism effects (detector metamerism and illumination metamerism).

In a preferred embodiment, the color camera is calibrated using the spectral engine. To perform the calibration, a target surface is measured by the spectral engine and an image of the same target surface is captured by the camera. The target surface need not be a standard color patch, but should be sufficiently uniform in color to allow for averaging of the field of view of the spectral engine. The color values detected by the pixels of the sensor of the camera corresponding to the measurement field of view are compared to color values derived from the measurement made by the spectral engine, and calibration parameters are calculated and stored. Alternatively, the color values detected by the camera may be converted to spectral values and calibration parameters may be calculated from a comparison of calculated and measured spectral values. The calibration may be performed on a one-time basis, periodically, or each time a spectral measurement is obtained by the spectral engine.

Figure 6:
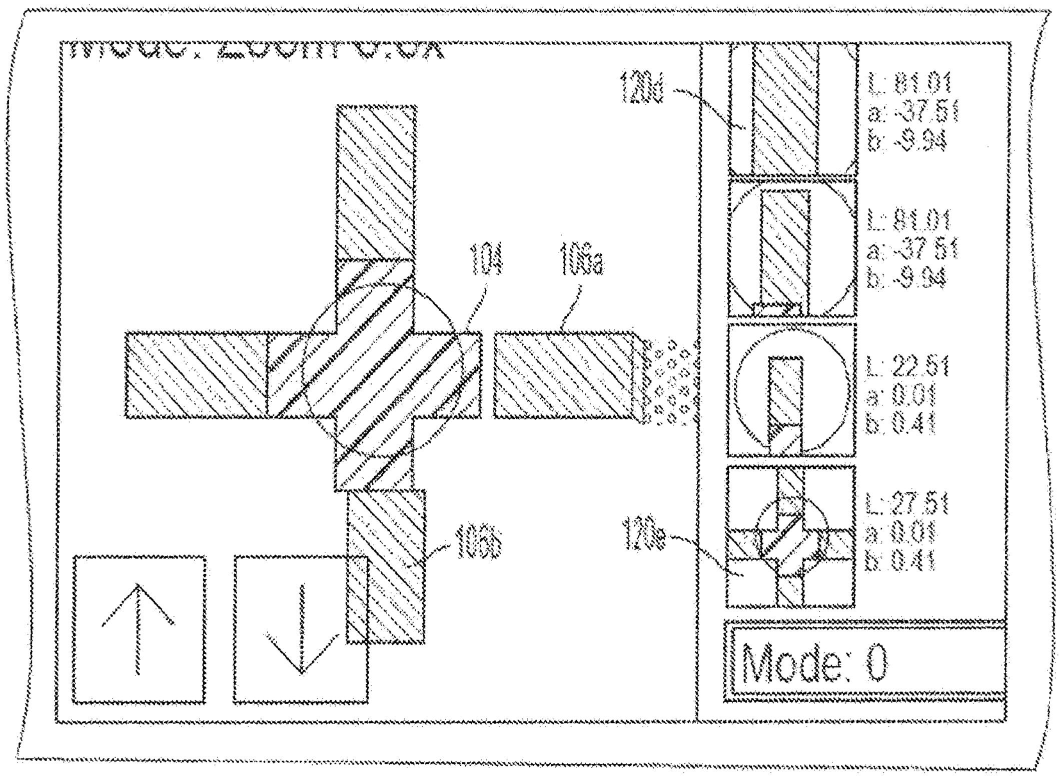
FIG. 6 is a view of the display of the color measurement instrument of FIGS. 1-3, displaying a zoom inspection tool according to another aspect of the present invention.

Referring to FIG. 6, in some embodiments, the spectrophotometer includes a "zoom" feature for the live view camera or a secondary camera of increased magnification directed at the same area of interest as the primary. The increased magnification enables halftone inspection by a user, as well as inspection for printing or manufacturing defects. The zoom feature also enables close inspection of registration mark alignment of different color separations. See, for example, FIG. 6, where registration marks 106*a* and 106*b* have a slight misalignment with registration mark 104.

Images of the registration marks may be recorded for quality assurance records. Additionally, the registration mark alignment (or misalignment) may be measured and scored. The measurements or scores may be provided to a user to adjust a printing or manufacturing process. The measurements or scores may also be recorded for quality assurance records.

In some embodiments, the image processing carried out by the processor includes optical character recognition, bar code recognition, and/or QR code recognition, to identify a job number associated with a printed product. The job number may then be used to retrieve a quality assurance package. The quality assurance package may include predefined job data to automatically configure instrument settings. The quality assurance package may also include color standard data, such as target color values to match on a printed product. Information from the quality assurance package may be automatically downloaded into the spectrophotometer. Automatic job number identification reduces inputs required of a user and the potential for erroneous job identification.

In one embodiment, a color measurement instrument for measuring colors of areas of interest of a target object comprises a spectral engine, having a first field of view; a camera, having a second field of view, the second field of view being larger than the first field of view and encompassing the first field of view; a display; and a processor coupled to the spectral engine, camera and display. The processor is configured with instructions stored in non-volatile memory that, when executed by the processor, cause the processor to display a live view of the second field of view on the display with a representation of the location of the first field of view superimposed on the live view of the second field of view. When the color measurement instrument is placed proximate to the target object, the live view on the display includes one or more of the areas of interest on the target object.

The instructions stored in non-volatile memory may further comprise instructions that, when executed by the processor, cause the spectral engine to make a color measurement of an area of interest on the target object within the first field of view.

The instructions stored in non-volatile memory further comprise instructions that, when executed by the processor, causes the spectral engine to make the color measurement in response to a user action.

In one example of the color measurement instrument described above, the instructions stored in non-volatile memory further comprise instructions that, when executed by the processor, cause the processor to automatically detect when the first field of view is wholly occupied by a single area of interest of the plurality of areas of interest and to cause the spectral engine to make the color measurement in response to such automatic detection.

In another example of the color measurement instrument described above, the instructions stored in non-volatile memory further comprise instructions that, when executed by the processor, cause the spectral engine to make a plurality of color measurements in response to the processor automatically detecting when the first field of view is wholly occupied by each of a plurality of areas of interest as the color measurement instrument is moved across the target object.

In another example of the color measurement instrument described above, the instructions stored in non-volatile memory further comprise instructions that, when executed by the processor, cause the processor to automatically detect when the first field of view is wholly occupied by a single area of interest of the plurality of areas of interest and to cause the spectral engine to make the color measurement in response to such automatic detection coupled with a user action. Stated another way, if a user attempts to make a measurement but the processor detects that the first field of view is not properly aligned with an area of interest, no measurement will be made until the misalignment is corrected.

In a further example of this embodiment described above, the camera comprises an image sensor and the instructions stored in non-volatile memory further comprise instructions that, when executed by the processor, cause the processor to automatically detect when the first field of view is wholly occupied by a single area of interest of the plurality of areas of interest by detecting a threshold level of color uniformity within pixels of the image sensor corresponding to the first field of view. In some examples, edge detection is also used for automatic detection of areas of interest.

In any of the examples of this embodiment described above, the instructions stored in non-volatile memory may further comprise instructions that, when executed by the processor, cause the processor to provide visual feedback on the display as to whether the first field of view is wholly occupied by a single area of interest.

In any of the examples of this embodiment described above, the instructions stored in non-volatile memory further comprise instructions that, when executed by the processor, cause the processor to provide targeting aids superimposed over a live view of areas of interest on the target object.

In any of the examples of this embodiment described above, the target object is a printed product and the areas of interest comprise printed color test patches.

In any of the examples of this embodiment described above, the display further comprises a rotatable hinged display.

In any of the examples of this embodiment described above, the color measurement instrument comprises a spectrophotometer. In one example, the spectral engine comprises a plurality of selectable spectral filters and a photodiode. In another example, the spectral engine comprises a linearly variable filter spectrophotometer. In another example, the spectral engine comprises a diffraction grating type spectrophotometer.

In another embodiment, a color measurement instrument for measuring colors of areas of interest of a target object comprises a spectral engine, having a first field of view; a camera, having a second field of view, the second field of view being larger than the first field of view and encompassing the first field of view; a display; and a processor coupled to the spectral engine, camera and display, the processor being configured with instructions stored in non-volatile memory that, when executed by the processor, cause the processor to generate a live view of the second field of view, to automatically detect one or more areas of interest within the second field of view and to further generate preview color measurements for one or more areas of interest within the second field of view, and to superimpose the preview measurements over their respective areas of interest in the live view. When the color measurement instrument is placed proximate to the target object, the live view on the display includes one or more of the areas of interest on the target object.

In a further example of this embodiment described above, the camera comprises an image sensor and the instructions stored in non-volatile memory further comprise instructions that, when executed by the processor, cause the processor to automatically detect areas of interest by detecting a threshold level of color uniformity within a subset of pixels of the image sensor. In a further example, the preview measurements superimposed on the live view comprise average color values of one or more subsets pixels. In some examples, edge detection is also used for automatic detection of areas of interest.

In one example of the color measurement of this embodiment, the instructions stored in non-volatile memory further comprise instructions that, when executed by the processor, cause the processor to display a live view of the second field of view on the display with a representation of the location of the first field of view superimposed on the live view of the second field of view.

In a further example of the color measurement instrument of this embodiment, the instructions stored in non-volatile memory further comprise instructions that, when executed by the processor, cause the spectral engine to make a color measurement of an area of interest on the target object within the first field of view. The processor may cause the spectral engine to make the color measurement in response to a user action.

In a further example of the color measurement instrument of this embodiment, the instructions stored in non-volatile memory may further comprise instructions that, when executed by the processor, cause the processor to automatically detect when the first field of view is wholly occupied by a single area of interest of the plurality of areas of interest and to cause the spectral engine to make the color measurement in response to such automatic detection.

In a further example of this embodiment described above, the camera comprises an image sensor and the instructions stored in non-volatile memory further comprise instructions that, when executed by the processor, cause the processor to automatically detect when the first field of view is wholly occupied by a single area of interest of the plurality of areas of interest by detecting a threshold level of color uniformity within pixels of the image sensor corresponding to the first field of view and to superimpose average color values of the pixels of the image sensor corresponding to the first field of view on the live view of the second field of view. In some examples, edge detection is also used for automatic detection of areas of interest.

In any of the examples of this embodiment described above, the color measurement instrument comprises a spectrophotometer. In one example, the spectral engine comprises a plurality of selectable spectral filters and a photodiode. In another example, the spectral engine comprises a linearly variable filter spectrophotometer. In another example, the spectral engine comprises a diffraction grating type spectrophotometer.

In another embodiment, a color measurement instrument for measuring colors of areas of interest of a target object comprises a spectral engine, having a first field of view, a camera, having a second field of view, the second field of view being larger than the first field of view and encompassing the first field of view; a display; and a processor coupled to the spectral engine, camera and display, the processor being configured with instructions stored in nonvolatile memory that, when executed by the processor, cause the processor to cause the spectral engine to make a color measurement of an area of interest on the target object within the first field of view and to cause the camera to record at least a portion of the second field of view including the first field of view. When the color measurement instrument is placed proximate to the target object, the second field of view includes one or more of the areas of interest on the target object. The instructions stored in non-volatile memory further comprise instructions that, when executed by the processor, cause the processor to display color values from a measurement made by the spectral engine along with an image of measured area interest acquired from the camera with the first field of view superimposed on the image.

In another embodiment, a color measurement instrument for measuring colors of areas of interest of a target object comprises a spectral engine, having a first field of view; a camera, having a second field of view, the second field of view being larger than the first field of view and encompassing the first field of view; a display; and a processor coupled to the spectral engine, camera and display, configured with instructions stored in non-volatile memory that, when executed by the processor, cause the processor to display a live view of the second field of view on the display with a representation of the location of the first field of view superimposed on the live view of the second field of view. When the color measurement instrument is placed proximate to the target object, the live view on the display includes one or more of the areas of interest on the target object. The instructions stored in non-volatile memory further comprise instructions that, when executed by the processor, cause the processor to zoom and display a magnified portion of a surface of the target object for visual inspection.

In an example of the color measurement device of this embodiment, the target object comprises a color printed product and the magnification of the surface of the target object allows for print inspection of halftone quality and printing defects.

In an example of the color measurement device of this embodiment, the target object comprises a color printed product and the instructions stored in non-volatile memory further comprise instructions that, when executed by the processor, cause the processor to record images of registration marks for quality assurance purposes. In some examples, an alignment (or misalignment) or registration marks is detected, measured, and scored.

In another embodiment, a color measurement instrument for measuring colors of areas of interest of a target object comprises a spectral engine, having a first field of view; a camera, having a second field of view, the second field of view being larger than the first field of view and encompassing the first field of view; a display; and a processor coupled to the spectral engine, camera and display, configured with instructions stored in non-volatile memory that, when executed by the processor, cause the processor to display a live view of the second field of view on the display with a representation of the location of the first field of view superimposed on the live view of the second field of view. When the color measurement instrument is placed proximate to the target object, the live view on the display includes one or more of the areas of interest on the target object. The instructions stored in non-volatile memory further comprise instructions that, when executed by the processor, cause the processor to read bar code information on the target object and retrieve quality assurance metrics from a computer/server based on the bar code reading.

In another embodiment, a color measurement instrument for measuring colors of areas of interest of a target object comprises a spectral engine, having a first field of view; a camera, having a second field of view, the second field of view being larger than the first field of view and encompassing the first field of view and one or more of the areas of interest; and a processor coupled to the spectral engine, camera, the processor being configured with instructions stored in non-volatile memory that, when executed by the processor, cause the processor to cause the spectral engine to make a measurement of the target object in response to the processor automatically detecting that a predetermined area of interest wholly occupies the first field of view.

In a further example of this embodiment described above, the camera comprises an image sensor and the instructions stored in non-volatile memory further comprise instructions that, when executed by the processor, cause the processor to automatically detect when the first field of view is wholly occupied by a single area of interest of the plurality of areas of interest by detecting a threshold level of color uniformity within pixels of the image sensor corresponding to the first field of view and to superimpose average color values of the pixels of the image sensor corresponding to the first field of view on the live view of the second field of view. In some examples, edge detection is also used for automatic detection of areas of interest.

In another example of this embodiment, the color measurement instrument is installed on a printing apparatus. In another example of this embodiment, the color measurement instrument is installed on equipment downstream of a printing apparatus.

The color measurement instrument of this embodiment may further comprise a display and instructions stored in non-volatile memory further comprise instructions that, when executed by the processor, cause the processor to display a live view of the second field of view on the display with a representation of the location of the first field of view superimposed on the live view of the second field of view.

Each of the above embodiments may be combined in a single spectrophotometer or implemented separately.

Each of the above embodiments may be combined in a single spectrophotometer or implemented separately. In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A color measurement instrument for measuring colors of areas of interest of a target object, comprising:
a spectral engine, having a first field of view;
a camera, having a second field of view, the second field of view being larger than the first field of view and encompassing the first field of view;
a display; and
a processor coupled to the spectral engine, camera and display, the processor configured with instructions stored in non-volatile memory that, when executed by the processor, cause the processor to:
generate a live view of the second field of view;
process image data to automatically detect one or more areas of interest within the second field of view;
process image data to obtain color value preview measurements for the one or more areas of interest from the live view of the second field of view without using the spectral engine;
superimpose the preview color values measurements over their respective areas of interest in the displayed live view; and
cause the spectral engine to make a spectral measurement of an area of interest on the target object for which color value preview measurements have been displayed when the area of interest comes within the first field of view.

2. The color measurement instrument of claim 1, wherein the instructions stored in non-volatile memory further comprise instructions that, when executed by the processor, cause the processor to:
obtain from the camera a measurement image comprising at least a portion of the second field of view including the first field of view; and
display color values from a measurement made by the spectral engine along with at least a portion of the measurement image including the first field of view.

3. The color measurement instrument of claim 2, wherein the measurement image is captured by the camera concurrently with the measurement by the spectral engine.

4. The color measurement instrument of claim 2, wherein the displayed at least a portion of the measurement image comprises a thumbnail image including the first field of view.

5. The color measurement instrument of claim 2, wherein the instructions stored in non-volatile memory further comprise instructions that, when executed by the processor, cause the processor to store the color values from a measurement made by the spectral engine along with the measurement image.

6. The color measurement instrument of claim 2, wherein the measurement image comprises substantially all of the second field of view, and wherein the instructions stored in non-volatile memory further comprise instructions that, when executed by the processor, cause the processor to store the color values from a measurement made by the spectral engine along with the measurement image.

7. The color measurement instrument of claim 1, wherein the instructions stored in non-volatile memory further comprise instructions that, when executed by the processor, cause the processor to automatically detect areas of interest by determining a threshold level of color uniformity within a subset of pixels of the image sensor and comparing the level of color uniformity to a predetermined threshold.

8. The color measurement instrument of claim 7, wherein the preview color measurements comprise average color values of the subset of pixels.

9. The color measurement instrument of claim 1, wherein the instructions stored in non-volatile memory further comprise instructions that, when executed by the processor, cause the processor to automatically areas of interest by detecting edges of the plurality of areas of interest.

10. The color measurement instrument of claim 1, wherein the instructions stored in non-volatile memory further comprise instructions that, when executed by the processor, cause the processor to zoom and display a magnified live view of the target object for close visual inspection.

11. The color measurement instrument of claim 10, wherein the instructions stored in non-volatile memory further comprise instructions that, when executed by the processor, cause the processor to record images of magnified views for quality assurance purposes.

12. The color measurement instrument of claim 1, wherein the instructions stored in non-volatile memory further comprise instructions that, when executed by the processor, cause the processor to read bar code information on the target object and retrieve quality assurance metrics from a computer/server based on the bar code reading.

13. The color measurement instrument of any of the preceding claims, wherein the instructions stored in non-volatile memory further comprise instructions that, when executed by the processor, cause the processor to display a live view of the second field of view on the display with a representation of the location of the first field of view superimposed on the live view of the second field of view.

14. The color measurement instrument of claim 13, wherein the instructions stored in non-volatile memory further comprise instructions that, when executed by the processor, cause the spectral engine to make a color measurement of an area of interest on the target object within the first field of view.

15. The color measurement instrument of claim 1, wherein the color value preview measurements comprise numerical valves in a three-dimensional color space.

16. The color measurement instrument of claim 1, wherein the color value preview measurements comprise L*a*b* values.

17. A color measurement instrument for measuring colors of areas of interest of a target object, comprising:
a spectral engine, having a first field of view;
a camera, having a second field of view, the second field of view being larger than the first field of view and encompassing the first field of view;
a display; and
a processor coupled to the spectral engine, camera and display, the processor configured with instructions stored in non-volatile memory that, when executed by the processor, cause the processor to:
generate a live view of the second field of view;
process image data to automatically detect one or more areas of interest within the second field of view by determining a threshold level of color uniformity within a subset of pixels of the image sensor and comparing the level of color uniformity to a predetermined threshold;
process image data to obtain color value preview measurements for one or more areas of interest from the live view of the second field of view without using the spectral engine;
superimpose the preview measurements over their respective areas of interest in the displayed live view; and cause the spectral engine to make a spectral measurement of an area of interest on the target object for which color value preview measurements have been displayed when the area of interest comes within the first field of view.

* * * * *